United States Patent [19]

Pennaz

[11] Patent Number: 5,602,089
[45] Date of Patent: *Feb. 11, 1997

[54] OIL BASED COMPOSITION CLEAN UP METHOD AND COMPOSITION FOR USE THEREIN

[75] Inventor: Thomas J. Pennaz, Brooklyn Park, Minn.

[73] Assignee: Deluxe Corporation, Shoreview, Minn.

[ * ] Notice: The term of this patent shall not extend beyond the expiration date of Pat. No. 5,308,390.

[21] Appl. No.: 400,855

[22] Filed: Mar. 8, 1995

Related U.S. Application Data

[62] Division of Ser. No. 41,830, Apr. 1, 1993, Pat. No. 5,411,596.

[51] Int. Cl.$^6$ .............................. C09D 9/00; C09D 9/04; C11D 3/60
[52] U.S. Cl. .......................... 510/171; 510/170; 510/201; 510/338; 510/353; 510/355; 510/407; 510/437; 510/475; 510/487; 510/491
[58] Field of Search ..................... 252/174.23, DIG. 2, 252/DIG. 8, 162, 170, 108, 122; 510/171, 170, 201, 338, 353, 355, 407, 437, 475, 487, 491

[56] References Cited

U.S. PATENT DOCUMENTS

| | | | |
|---|---|---|---|
| 4,094,837 | 6/1978 | Johnson | 106/14.24 |
| 5,009,716 | 7/1991 | Gerson | 134/40 |
| 5,104,567 | 4/1992 | Staehr | 252/174.17 |
| 5,143,639 | 9/1992 | Krawack | 252/162 |
| 5,194,173 | 3/1993 | Folkard et al. | 252/170 |
| 5,308,390 | 5/1994 | Pennaz | 106/20 R |
| 5,338,351 | 8/1994 | Pennaz | 106/20 R |
| 5,340,493 | 8/1994 | Principato | 252/162 |
| 5,354,366 | 10/1994 | Pennaz et al. | 106/20 R |
| 5,354,367 | 10/1994 | Pennaz | 106/20 R |
| 5,380,453 | 1/1995 | Krawack | 252/162 |
| 5,382,282 | 1/1995 | Pennaz | 106/20 R |
| 5,431,721 | 7/1995 | Pennaz et al. | 106/20 R |
| 5,454,956 | 10/1995 | Pennaz | 210/708 |

OTHER PUBLICATIONS

*Hawley's Condensed Chemical Dictionary*, 12th ED., 1993, pp. 850–851 & 852 (definitions of "oil & oleic acid").

*Primary Examiner*—Ardith Hertzog
*Attorney, Agent, or Firm*—Dorsey & Whitney LLP

[57] ABSTRACT

A method and composition for clean up of an oil based composition using an aqueous solution. The clean up composition includes 5–60% by weight of a solubility controlling component exhibiting pH dependent water solubility behavior and 30–95% by weight of a diluent. The method includes applying the clean up composition to the oil based composition and cleaning the same with an aqueous solution having a wash pH falling within the pH levels at which the solubility controlling component is water washable.

6 Claims, No Drawings

OIL BASED COMPOSITION CLEAN UP METHOD AND COMPOSITION FOR USE THEREIN

This is a division of application Ser. No. 08/041,830 filed Apr. 1, 1993, now U.S. Pat. No. 5,411,596.

BACKGROUND OF THE INVENTION

1. Field of the Invention

The present invention relates generally to a method and composition for an oil based composition, and more particularly to a method and composition for clean up of an oil based coating composition. The present invention includes a method and composition for converting an oil based composition to a water soluble or washable form so that it can be cleaned up using aqueous wash solutions. The method of the present invention also facilitates recovery of the oil based composition from the aqueous wash solution.

2. Description of the Prior Art

When working with oil based compositions, and in particular, oil based coating compositions such as inks, paints, varnishes and the like, the clean up following application of such oil based coatings usually involves use of organic solvents for the purpose of dissolving the oil based composition and removing it from application equipment, tools and the like. This creates a waste solution comprised of the organic wash solvent and the dissolved oil based composition as well as shop towels saturated with the organic wash solvent and such composition. Such a clean up process gives rise to both air and water pollution by emitting volatile organic compounds (VOCs) into the atmosphere and by creating disposal problems for the waste solvents and dissolved oil based compositions. Many of these are considered hazardous wastes whose disposal is tightly controlled.

The above problems are partially solved by using special compositions exhibiting at least limited water solubility behavior as a function of pH. These special compositions are described in applicant's copending application Ser. No. 07/946,762 filed Sep. 17, 1992, now abandoned and applicant's copending application Ser. No. 08/041,789 entitled Method of Cleaning Waste Water and Recovery of Contaminants Therefrom filed on Apr. 1, 1993, now U.S. Pat. No 5,454,956, the entirety of both being incorporated herein by reference. By using these specially formulated compositions, the water solubility of such compositions can be selectively controlled and converted by adjusting the pH of the wash solution. This, in turn, facilitates clean up of these special compositions with aqueous wash solutions and removal and recovery of such compositions by filtration or other known separation techniques.

A problem continues to exist, however, with respect to the clean up of oil based compositions, and in particular oil based coating compositions which do not exhibit pH dependent water solubility behavior. U.S. Pat. Nos. 5,009,716 and 5,104,567 issued to Gerson and Staehr, respectively, have attempted to address this problem with respect to the clean up of oil based lithographic ink compositions. Both of these patents are directed principally to the use of wash or clean up solutions generally compatible or soluble with the ink composition, but which do not contain the undesirable VOCs. Specifically, U.S. Pat. No. 5,104,567 discloses the use of a vegetable oil/emulsifier blend to clean the equipment, while U.S. Pat. No. 5,009,716 discloses the use of fatty acids as a carrier for various nonionic surfactants. In both applications, relatively large quantities of wash solutions are required to fully clean and flush the equipment. Further, when clean up is completed, many of the same problems of biodegradability, environmental and disposal exist with respect to the wash solution and removed ink composition.

Accordingly, a need continues to exist for a clean up method and composition for oil based coating compositions, and more particularly, a clean up method for oil based coating compositions which do not exhibit pH dependent water solubility. A need also exists for recovering such oil based compositions from spent wash solutions and the like used in the clean up process, thereby further minimizing pollution and hazardous waste concerns.

SUMMARY OF THE INVENTION

The present invention relates generally to a dean up process and composition for an oil based composition, and more particularly to a dean up method and composition for an oil based coating composition which facilitates clean up using aqueous wash solutions and the subsequent recovery of the oil based composition therefrom.

The method of the present invention is applicable to the clean up of oil based compositions generally, and in particular to oil based coating compositions such as lithographic and other printing inks, paints, varnishes and the like. The types of oil based coating compositions to which the method of the present invention has particular applicability are those that do not exhibit selective water solubility behavior as a function of pH and are compatible with one or more of the various water reducible compositions such as water reducible alkyds, polyesters or other resins. As used herein, water reducible compositions such as those referenced above, are compositions which exhibit total or partial selective water solubility behavior as a function of the pH of the solution to which they are exposed. In other words, a water reducible composition will be, or tend to be, water insoluble at certain first pH levels and water soluble or washable at certain second pH levels.

The method of the present invention involves applying a specially formulated clean up composition to the oil based composition which is to be cleaned up. In the case of a lithographic printing system in accordance with the preferred method, this involves applying the clean up composition to the print rollers, plates, blanket cylinder, etc. so that the clean up composition is mixed with or milled into the residual ink composition on such equipment.

The above mentioned specially formulated clean up composition preferably includes a solubility controlling component whose viscosity has been adjusted to a desired level by a diluent which is compatible both with the solubility controlling component and the oil based composition which is to be cleaned. The solubility controlling component is a composition whose water solubility is selectively controllable as a function of pH and is comprised of various water reducible compositions such as water reducible alkyds, polyesters and other resins.

Application of the clean up composition in the manner provided above results in at least partial dissolution or miscibility of the oil based component into the clean up composition. The dissolved or partially dissolved oil based composition is then removed from the application equipment and tools using an aqueous solution with a pH adjusted to a level at which the solubility controlling component, and thus the clean up composition, is water soluble or washable. It has been found that this characteristic of the clean up composition provides the oil based composition with similar characteristics which are sufficient to facilitate clean up of the oil based composition using an aqueous based solution. This results in a spent wash solution and shop towels or other clean up aids containing dissolved or finely dispersed particles of the oil based and clean up compositions.

Following clean up of the application equipment and tools as described above, the oil based composition can be removed and recovered from the spent wash solution by first changing the pH of such solution to a level at which the clean up composition and oil based composition are water insoluble. This causes such compositions to precipitate out and to form a precipitate which can be easily removed by filtration or other separation techniques. The resulting filtrate is a clear aqueous liquid substantially free of any clean up or oil based composition.

Accordingly, it is an object of the present invention to provide a clean up method and composition for an oil based composition, and more particularly an oil based coating composition, using aqueous wash solutions.

Another object of the present invention is to provide a clean up process for an oil based composition which overcomes many of the environmental, safety and disposal problems which currently exist in the art.

A further object of the present invention is to provide a clean up method and composition for oil based coating compositions which uses aqueous wash solutions and which includes recovery of the oil based composition therefrom.

A still further object of the present invention is to provide a clean up method and composition for oil based coating compositions which do not exhibit pH dependent water solubility behavior.

A still further object of the present invention is to provide a clean up process and composition for conventional oil based lithographic ink compositions which do not exhibit pH dependent water solubility behavior.

These and other objects of the present invention will become apparent with reference to the description of the preferred method and composition described below.

DESCRIPTION OF THE PREFERRED METHOD AND COMPOSITION

The present invention relates to a clean up method and composition for oil based compositions, and more particularly to a clean up method and composition for oil based coating compositions such as lithographic or other printing inks, paints, varnishes and the like. The method and composition of the present invention will be described with respect to the clean up of a lithographic ink composition; however, it should be understood that the present method and composition are also applicable to the clean up of other oil based compositions and in particular oil based coating compositions such as nonlithographic inks, paints, varnishes and the like.

The method and composition of the present invention are applicable to oil based coating compositions which exhibit two principal properties. First, such coating compositions are generally not water soluble, either inherently or as a function of pH, but are generally soluble in organic or other non-aqueous solvents. Thus, the oil based compositions to which the present invention is applicable are generally water insoluble regardless of the pH of the aqueous solution to which they are exposed. Secondly, the oil based compositions to which the present invention is applicable must be compatible with the clean up composition. The term "compatible" or "compatible with" is synonymous with solubility or miscibility. In other words, a component which is compatible with a second component means that such component is miscible with or capable of dissolving or dissolving in such second component.

The method and compositions of the present invention have been shown to be applicable to various conventional oil based coating compositions including a wide variety of lithographic ink compositions, various nonlithographic or other ink compositions and various conventional oil based paint and varnish compositions. Examples include Multigraphics PS-274, an oil based lithographic ink made by AM Multigraphics; Sun Chemical oil based lithographic news ink No. 21829; Flint NWK-312 an oil based letterpress ink; Handschy Ram Rod, No. BK 2030 BZ, an oil based heatset ink; and Handschy oil based process blue ink No. B-15787-M.

In accordance with the method of the present invention, the mixing or combination of certain water reducible or clean up compositions with, or the application of such compositions to, a compatible oil based composition will result in such mixture or combination also exhibiting pH dependent water solubility or washability behavior. In other words, the resulting mixture or combination will be generally water insoluble at certain first pH levels and water soluble or washable at certain second pH levels. This facilitates clean up and removal of the combination or mixture, and thus the oil based composition from application equipment, tools and the like with an aqueous wash solution adjusted to a wash or clean up pH falling within the second pH levels.

The clean up composition of the present invention must exhibit three principal properties. First, it must exhibit selective water solubility behavior which is pH dependent. In other words, it must be generally water insoluble at certain first pH levels and generally water soluble or water washable at certain second different pH levels. Secondly, it must be compatible with the oil based composition with which it is intended to be used. Thus, the components of the clean up composition must be miscible with, or capable of dissolving or being dissolved in, the oil based composition at a pH falling within the first pH levels. Thirdly, the clean up composition must have a sufficiently low viscosity to facilitate acceptable mixing or combination with or application to, the oil based composition.

The principal components of the clean up composition of the present invention include a solubility controlling component compatible with the oil based composition to be cleaned and exhibiting pH dependent water solubility behavior and a diluent or thinner which is compatible both with the solubility controlling component and the oil based composition to be cleaned. The diluent should also preferably be free of VOCs. The solubility controlling component should preferably be water insoluble under certain conditions and water washable at other conditions and such water solubility behavior should be pH dependent.

It is contemplated that the pH dependent water solubility of the clean up composition can be either an acid functional system in which the composition is water insoluble at acid conditions and water soluble at alkaline conditions or an alkaline functional system in which the composition is water insoluble at alkaline conditions and water soluble at acid conditions. The preferred system, however, is an add functional system.

In the preferred embodiment, the solubility controlling component is comprised of a water reducible alkyd, polyester or other resin exhibiting the desired pH dependent water solubility characteristics. By selecting the alkyd, polyester or other component which is both compatible with the diluent or thinner as described below and the oil based composition which is to be cleaned, it has been found that the resulting clean up composition and the oil based composition with which it is mixed or combined also exhibit sufficient pH dependent water solubility behavior to facilitate its clean up with an aqueous solution.

In the most preferred clean up composition, the solubility controlling component is comprised or partially comprised of a water reducible alkyd. In an acid functional system the water solubility characteristics of such alkyd, and thus the water solubility characteristics of the resulting clean up composition and the combined oil based composition is controlled by appropriate selection of the Acid Number or amount of "free" acid of the alkyd. More specifically, the alkyd and its particular Acid Number are selected so that the alkyd and the resulting dean up composition and combined oil based composition are water insoluble at certain first pH levels, while being water soluble or water washable at certain other pH levels. The particular Acid Number or Acid Number range which will be effective to provide the alkyd with the desired solubility characteristics will vary to some degree depending upon the particular alkyd or alkyd blend. However, those alkyds or alkyd blends useful in the present invention will have a particular minimum Acid Number or Acid Number range within which they will exhibit the desired selective water solubility behavior. For most water reducible alkyds and other resins, this Acid Number will be greater than 25 mg KOH/gram of alkyd. More preferably such Acid Number will be greater than about 30 and most preferably greater than about 40.

The above identified minimum Acid Numbers define a characteristic of the water reducible alkyd or other resin, and thus the resulting clean up composition, which will be water insoluble and stable at certain first phi levels and water soluble or washable at certain other second pH levels. The above minimum Acid Numbers are applicable to most water reducible alkyds, polyesters and other resins usable in accordance with the present invention. However, these values may vary somewhat depending on the particular water reducible alkyd or other resin selected and the particular oil based composition to be removed. The above numbers define the transition between water insolubility and water solubility which is pH dependent. With Acid Numbers below the above values, the alkyd and thus the resulting dean up composition and combined oil based composition are water insoluble regardless of the pH. The necessary minimum Acid Number for a particular resin will be dependent on its particular structure. Maximum Acid Numbers are not a requirement. However, the higher the Acid Number, the more acid will be needed to neutralize the composition during the recovery process described below. Thus, the preferred maximum Acid Number is 300, the more preferred is 200 and the most preferred is 150.

Water reducible alkyds or other resins having Add Numbers within the above ranges will be water insoluble at certain acidic pH levels, thus pH levels below 7.0, and water soluble or washable at certain alkaline pH levels, thus pH levels above 7.0.

It is also contemplated that in accordance with the present invention, the solubility controlling component of the clean up composition may comprise either a single water reducible alkyd or resin, a blend of two or more such compounds or various other water reducible compounds which exhibit the desired water solubility characteristics or behavior of being water insoluble under certain pH levels and water washable under certain other pH levels. It has been shown that certain water reducible alkyds (Cargill's short oil alkyds 74-7450, 74-7451; Cargill's long oil alkyd 74-7416; Cook Composite's short oil alkyd 101210), certain water reducible polyesters (Cargill's polyester 72-7203), certain water reducible polyolefins (Cargill's modified polyolefin 73-7358), certain water reducible modified oils (Cargill's modified linseed oil 73-7319) and certain water reducible epoxy esters (Cook Composite's styrenated epoxy ester 100453) exhibit the desired characteristics and are acceptable provided they are compatible with the diluent and with the oil based composition to be cleaned up and are applied in an amount sufficient to cause the oil based composition to exhibit similar characteristics. All of the above are compatible with castor oil except for Cargill's modified linseed oil 73-7319 which is compatible with linseed and soya oil and Magie solvent. Cargill's short oil alkyd 74-7451 is additionally compatible with linseed oil at certain alkyd concentrations. All of the above are also compatible with oleic acid. All of the above water reducible resins except 73-7319 and 73-7358 are available in a solvent diluted form. For those available in a solvent diluted form it is preferable for the solvent to be stripped.

Water reducible compositions which are applicable for use as the solubility controlling component in the composition of the present invention generally have relatively high viscosities and as such, are not conducive to mixing or combination with or application to, the oil based composition. In fact, many of the water reducible resins which are applicable to the present invention have viscosities as high as 8000 centipoise or more when measured at 25° C. It has been determined that the clean up composition should have a viscosity of less than about 300 centipoise, more preferably less than about 100 centipoise and most preferably less than about 50 centipoise in order to function acceptably in the present invention. In the clean up composition of the present invention, the viscosity is lowered, and thus controlled, by the diluent.

The diluent or thinner which may be used in the clean up composition of the present invention must be compatible with both the solubility controlling component of the clean up composition and the oil based composition to be cleaned. Although various petroleum solvents such as Vista Solv, Magie Solvent or various aromatic distillates may be used for this purpose, petroleum based solvents are not preferred since they contain VOCs and thus create environmental concerns of their own. The preferred diluents are those other than petroleum solvents which are free of VOCs and which include, among others, fatty acids such as oleic and a stearic acids and the vegetables oils such as soy, linseed and castor oil. Mineral oils can also be used. The diluent may consist of a single diluent or may comprise a combination of one or more different diluents. For example, combinations of oleic acid with soy, castor or linseed oil provide excellent results.

The clean up composition of the present invention must also contain a sufficient amount of solubility controlling component as compared to the diluent to provide the entire clean up composition, as well as the oil based composition with which it is combined, with pH dependent water solubility or washability behavior. Preferably the solubility controlling component should comprise greater than about 5% by weight of the clean up composition and preferably in the range of about 5–60% by weight. More preferably the solubility controlling component should be present in an amount greater than about 10% by weight and in the range of about 10–30% by weight.

The diluent or diluent combination should also be present in an amount sufficient to provide the clean up composition with the desired viscosity. Preferably, the diluent should comprise about 30–95% by weight. This amount of solubility controlling component as compared to the diluent also has the effect of defining a lower viscosity limit for the clean up composition since the viscosity of such composition is directly related to the respective amount of solubility controlling component and the diluent. Preferably the lower viscosity limit should be about 20 centipoise and more preferably about 40 centipoise.

Various additives such as surfactants have also been shown to improve the cleaning efficiency of the clean up composition. Specifically, nonionic surfactants such as Mazawett 77 made and sold by PPG Industries (formerly Mazer Chemical) and Surfonyl 104 made and sold by Air Products have been shown to be acceptable. Addition of a small amount of surfactant does not interfere with, but in fact appears to aid, the water clean up step described below. Preferably the surfactant should be present in an amount of about 0.5–10% by weight and most preferably in an amount of about 2–5% by weight.

Practice of the method of the present invention assumes an oil based composition which needs to be cleaned up. For an oil based coating composition, this is normally the coating composition residue which remains on the application equipment and tools following the application step. The application step is dependent upon the particular oil based composition being used and the particular environment in which such composition is being applied. In a lithographic printing application in accordance with the preferred method, the ink composition, together with an aqueous fountain solution, are applied to a lithographic printing plate by application rollers. The ink is then transferred either directly to an image receiving substrate or to an intermediate blanket cylinder which then subsequently transfers the ink to the receiving substrate. During the process of lithographic printing, the entire print train, including the application roller, the print plate and the blanket is exposed to the oil based ink composition.

The initial step in accordance with the method of the present invention involves applying a quantity of compatible clean up composition to the oil based composition on the application equipment and tools and mixing or milling the clean up composition into the oil based composition. This requires preliminary determination of the compatibility of the clean up composition with the oil based composition, either by knowing the make up of the oil based composition or by testing it. Thus, a preliminary step involves identifying a clean up composition which is compatible with the oil based composition to be cleaned.

Although certain advantages of the present method can be achieved by application alone, it is highly preferred that the clean up composition be mixed or milled into the oil based composition so that the oil based composition can be either fully or partially dissolved in or rendered miscible with, the clean up composition. The amount of clean up composition to be used will depend upon various factors, including the particular oil based composition, the amount of oil based composition on the application equipment and tools and the properties of the particular clean up composition. In the lithographic printing application, the clean up composition is applied by spraying or other application to the front end rollers of the print train and cycling the print train for a period of about 30 seconds. This insures that sufficient application and mixing of the clean up composition with the oil based composition has occurred. During this application step, the clean up composition, and in particular the solubility controlling component, mixes with the oil based composition to provide it with at least limited pH dependent water solubility or washability behavior.

Following application of the clean up composition to the application equipment and tools as described above, the clean up composition and the wholly or partially dissolved oil based composition is removed from such equipment and tools. This is accomplished by flushing or wiping the application equipment with, or otherwise exposing it to, an aqueous wash solution with a clean up or wash pH corresponding to, or failing within, the second pH levels defined above. Such flushing or wiping should be continued until the entire ink train and/or the blanket are clean. In the preferred procedure, the aqueous wash solution is applied in a manner such that the wash solution is mixed with or milled into the clean up and oil based composition mixture on the application equipment. Preferably the surfaces of these components are then wiped with a shop towel or the like to finally remove any remaining oil based composition contaminant.

Because the aqueous wash solution is at a pH level corresponding to the second pH levels (i.e., above 8.5 for the preferred method), the clean up and oil based composition mixture becomes water soluble or water washable, thus facilitating its removal from the application equipment or tool surfaces either by the flushing alone or by the flushing action together with a wiping of such surfaces using a shop towel, brush or the like. This removal step for the lithographic printing application of the preferred process produces a resulting spent wash solution containing dissolved or finely dispersed particles of the clean up and oil based compositions. The removal step also results in soiled shop towels, brushes and/or other cleaning aids which contain similar materials including dissolved or finely dispersed particles of the clean up and oil based compositions.

The particular efficiency of the removal or cleaning step in the lithographic printing application will depend upon various factors including, among others, the pH level of the aqueous wash solution, the temperature of the wash solution, the amount of wash solution used and whether or not surfactants or other additives are used. In the preferred system, an increase in the pH of the wash solution will result in an increase in the speed with which the clean up and oil based composition mixture will be removed from the surfaces and a decrease in the volume of wash solution which must be utilized. Preferably, the pH of the wash solution should be greater than about 8.5, or in the range of 8.5–14 and most preferably greater than about 10.5 or in the range of 10.5–13. Increase in temperature will also tend to increase the efficiency of the removal or cleaning step by speeding up the conversion of the clean up and oil based compositions to a water soluble form and thus removal from the equipment. However, it is contemplated that most of the removal or cleaning steps will be performed at or about ambient temperatures.

Various additives can also be used to alter, and in particular to improve, the efficiency of the removal or cleaning step. For example, the use of various surfactants, cosolvents and other additives common to the industry may also be used as part of the wash solution. Selection of the appropriate surfactant will depend on the particular composition. Examples of surfactants which have been found to be useful with oil based lithographic ink compositions and the clean up compositions described above include a nonionic surfactant made by PPG Industries (formerly Mazer Chemical) and sold under the trade name Mazawett 77, a nonionic surfactant made by Air Products and sold under the trade name Surfonyl 104 and a cationic surfactant made by PPG Industries and sold under the trade name M Quat 1033. Various other nonionic, cationic and anionic surfactants may also be used.

While not necessary to the practice of the present invention, it is believed that surfactants provide additional surface wetting and dispersion characteristics during the cleaning (or solubilization) step. Of equal importance is the fact that the surfactants do not interfere with, but in fact appear to aid, the water clean up (or insolubilization) step described below. This appears to result from the ability of the surfactants to surround the growing particles as they are formed. This in turn enhances the filterability of the resulting mixture.

Following removal of the clean up and oil based composition mixture from the application equipment and tools, such mixture exists as a dissolved portion of the spent wash solution or as finely dispersed particles within such solution. A portion of the removed clean up and oil based composition mixture is also contained within the shop towels or other cleaning aids either as dissolved portions of the spent wash solution or as finely dispersed particles.

For that portion of the oil based composition existing in a dissolved or finely dispersed form within the spent wash solution, recovery of the clean up and oil based compositions involves first changing the pH of the spent wash solution to a precipitation pH corresponding to or falling with the first pH levels and then removing or recovering the oil based composition by filtration, centrifugation or various other separation techniques known in the art.

In the preferred system, lowering the pH of the spent wash causes the clean up and oil based compositions to become water insoluble. This in turn causes such compositions to precipitate out, thereby facilitating their separation by filtration, centrifugation or the like. In addition to causing the oil based composition to precipitate out, the conversion to a water insoluble form also results in the precipitated particles having an affinity for one another so that agglomeration of particles occurs. This further improves the ability to separate the precipitated particles of the oil based composition from the aqueous wash solution.

Both the rate and extent to which the clean up and oil based compositions come out of solution or combine to form particles large enough to filter is dependent upon the amount of acid (or free protons) in the wash solution. This depends upon the pH level to which the spent wash solution is lowered which in turn is determined by the amount and strength of the particular acid being used. During the process of lowering the pH, acid is consumed as it reacts with the acid functional groups of the solubility controlling component of the clean up composition, thereby rendering it nonionic. At a pH of 6, the acid is relatively dilute and the chance for neutralization is reduced since the available acid is not in great supply. Thus, at a pH of 6, the extent of precipitation is diminished and the time for precipitation to occur is longer. As much as several hours may be required for the precipitation to reach its maximum levels. In contrast, if the pH of the spent wash solution is lowered to a pH of 2, excess acid is available and the conversion occurs to a greater extent and very rapidly, on the order of a few seconds to several minutes. Preferably, for complete precipitation and separation of the clean up and oil based composition particles from the aqueous solution, a pH below 5 or in the range of about 4–5 is preferred. At pH levels above 5, insufficient acid exists to fully neutralize the material. This results in incomplete separation. At pH levels below 4, excess acid is present. This will not necessarily improve the overall separation, but will speed up the process. Thus, below a pH level of 4, economic analysis will determine whether increased speed justifies the excess acid for a given application.

It has been shown that various additives can improve the conversion of the clean up and oil based compositions from a water soluble or washable form to a water insoluble form, and thus its precipitation. For example, certain salts, specifically sodium chloride and potassium chloride, have been shown to have such an effect. It is believed that this is due to the equilibrium shifting effect of the excess ions which reduces the ionic effect of the acid groups and shifts the solubility of the material down. The presence of salt will not appreciably impact the ultimate extent of separation, but will tend to speed up the process.

After the pH of the spent wash solution has been lowered and the clean up and oil based compositions precipitated, such precipitated particles can be removed through various separation techniques such as filtration, centrifugation and the like which are known in the art. Filtration will normally be the most efficient separation technique. Separation via filtration can be improved with the use of various filter aids known in the art. If the density difference between the particles and the water is sufficiently large, separation via centrifugation is a viable alternative.

With respect to the shop towels which contain portions of the clean up and oil based compositions, either in a dissolved or a finely dispersed form in the spent wash solution, the separation and recovery of the clean up and oil based compositions are similar to the separation and recovery of the oil based composition from the spent wash solution described above. However, a first step with respect to shop towels or other cleaning aids requires the removal of such compositions from the shop towels themselves. This can accomplished by washing, soaking or rinsing the shop towels in a washing pH solution falling within the second pH levels. An alternate procedure is to launder the shop towels in a conventional or modified manner using conventional or modified laundering detergents or other compositions for the purpose of cleaning the clean up and oil compositions from the towels. In both situations, the clean up and off based compositions end up as dissolved or finely dispersed particles in the wash or laundry solutions. Following this removal or cleaning procedure, the resulting spent wash or laundry solution is treated in a manner similar to that described above by changing the pH to a precipitation pH corresponding to the first pH levels. When this is done, the previously dissolved or finely dispersed clean up and oil based compositions will become insoluble. This in turn causes the composition to precipitate out and combine with one another to form into larger particles capable of separation by filtration or the like.

In a conventional or modified laundering process which normally includes the presence of surfactants and detergents, such materials actually improve the precipitation process. During the conversion of the clean up and oil based compositions from being water soluble to water insoluble, such surfactants and detergents surround the particles and maintain them as discrete particles. This promotes larger particles and easier separation.

Having described the details of the preferred method and composition, the following examples will demonstrate the applicability of the method and composition of the present invention to various oil based compositions as well as application of the method to various clean up compositions. Throughout the application, and in the following examples, percentages are based upon weight unless otherwise indicated.

EXAMPLES 1–4

Examples 1–4 show various clean up composition formulations and demonstrate the applicability of various diluents or diluent combinations with a specific solubility controlling component (SCC). Examples 1, 2 and 3 show use of a surfactant, while Example 4 does not. The surfactant of Examples 1, 2 and 3 was Mazawett 77, a nonionic surfactant made and sold by Mazer Chemical. The solubility controlling component was a water reducible long oil alkyd made and sold by Cargill under No. 74-7416. This SCC had an Acid Number of about 55 and was stripped of solvent before use.

| Example | SCC (%) | Diluent #1 (%) | Diluent #2 (%) | Surfactant (%) |
|---|---|---|---|---|
| 1 | 74-7416 (15%) | Soy oil (82%) | | Mazawett (3%) |
| 2 | 74-7416 (9%) | Soy oil (44%) | Oleic Acid (44%) | Mazawett (2%) |
| 3 | 74-7416 (9%) | Castor oil (44%) | Oleic Acid (44%) | Mazawett (2%) |
| 4 | 74-7416 (11%) | Linseed oil (44.5%) | Oleic Acid (44.5%) | |

Procedure: An A. B. Dick 375 printing press was inked with Multigraphics PS-274 lithographic ink. Multigraphics PS-274 ink is a conventional oil based lithographic ink made by AM Multigraphics which does not exhibit pH dependent water solubility. The ink film on the roller train was 0.7 mil (0.0007 inch). The clean up composition was added to the roller train and flushed with water adjusted to pH 13 with sodium metasilicate. Twenty milliliters of clean up composition was used. The clean up or wash time was as follows:

| Example | Wash Time (minutes) |
|---|---|
| 1 | 3:10 |
| 2 | 3:05 |
| 3 | 3:25 |
| 4 | 3:50 |

Attempts were also made to clean up the ink composition with water adjusted to pH 13, without any clean up composition. Such clean up was not possible.

EXAMPLES 5–9

Laboratory experiments were carried out to determine the resultant water solubility of mixtures of a conventional oil based lithographic ink with various clean up composition formulations.

The procedure employed involved mixing A. M. Multigraphics PS-274 lithographic ink with each of the following clean up compositions in the relative amounts set forth below:

| Example No. | Clean Up Composition Formulation |
|---|---|
| 5 | 100% Oleic Acid (Emersol 214, Henkel) |
| 6 | 90% Oleic Add, 10% Cargill 74-7451 |
| 7 | 97% Oleic Add, 3% Mazawett 77 |
| 8 | 87% Oleic Add, 10% Cargill 74-7451, 3% Mazawett 77 |
| 9 | 77% Oleic Add, 20% Cargill 74-7451 3% Mazawett 77 |

Mixing was done with an ink knife for two minutes. One gram of the mixture was then agitated with 99 grams of water adjusted to pH 12.5 with sodium hydroxide. Solubility of the mixture was determined visually and was based on whether complete dispersion in the water was achieved.

After dispersion, the pH was lowered to pH 2.1 using hydrochloric acid. For those samples exhibiting solubility of the mixture in the water, the solution was filtered through #40 Whatman filter paper under vacuum. The filtrate was analyzed for clarity after filtering. For these samples showing no solubility, separation was not attempted. Additionally, for those showing solubility, the mixture/water solutions were filtered at pH 12.5 to determine whether separation was possible without lowering the pH.

| Example # | Weight PS-274 | Clean Up Composition | Solubility @pH 12.5 | Filtrate pH 12.5 | Filtrate pH 2.1 |
|---|---|---|---|---|---|
| 5 | 1 gm | 10 gm | None | N/A | N/A |
| 6 | 1 gm | 5 gm | Complete | Dark no separation | Clear, complete separation |
| 7 | 1 gm | 5 gm | None | N/A | N/A |
| 8 | 1 gm | 5 gm | Complete | Dark no separation | Clear, complete separation |
| 9 | 1 gm | 2 gm | Complete | Dark no separation | Clear, complete separation |

EXAMPLE 10

Convention AM Multigraphics PS-274 oil based lithographic ink was applied to the rollers of an A.B. Dick 375 offset lithographic press until a consistent film of 0.7 mil (0.0007 inch) was measured using an ink film thickness gauge. Twenty ml of a clean up composition comprised of 10% by weight of Cargill 74-7451 and 90% by weight of oleic acid was applied to the rollers and allowed to mill into the ink train for 100 press revolutions. Cargill 74-7451 is a water reducible short oil alkyd (AN 53–58) made by Cargill which was solvent stripped prior to use. A washup tray was then fitted on the press and the press rollers started. An aqueous wash solution of water/sodium metasilicate adjusted to pH 12.5 was sprayed on the rotating rollers until all ink was removed. A stopwatch was used to time the entire operation from the time where the wash up blade was attached to the press. The clean up time was 2:30 minutes. An attempt was made to clean the rollers using only the water/sodium metasilicate solution (pH 12.5), but the rollers could not be adequately cleaned with such solution.

EXAMPLE 11

The procedure of Example 10 was followed except that the ink used was Handschy RamRod Heatset Black oil based lithographic ink. The same clean up composition was used. The clean up time was 2:40 minutes. Use of the water/sodium metasilicate solution alone failed to adequately clean the rollers.

EXAMPLE 12

The procedure of Example 10 was followed except that the ink was Flint NWK-312, an oil based letterpress magnetic ink, was used. The same clean up composition was used. The clean up time was 2:55 minutes. Use of the water/sodium metasilicate solution alone failed to adequately clean the rollers.

EXAMPLE 13

The procedure of Example 10 was followed except that the ink was an oil based lithographic new inks made by Sun Chemical and the clean up composition was comprised of 10% by weight of Cargill 74-7416, 43.5% by weight of oleic acid, 43.5% by weight of soy oil and 3% by weight of a nonionic surfactant identified as Mazawett 77. Cargill 74-7416 is a water reducible long oil alkyd further identified in Examples 1–4. The clean up time was 2:45 minutes. Use of the water/sodium metasilicate solution alone failed to adequately clean the rollers.

EXAMPLE 14

The procedure of Example 10 was followed except that the ink was a Handschy oil based process blue ink. The clean up composition was the same as Example 10. The clean up time was 2:40 minutes. Use of the water/sodium metasilicate solution alone failed to adequately clean the rollers.

Although the description of the preferred method have been quite specific, it is contemplated that various modifications could be made without deviating from the spirit of the present invention. Accordingly, it is intended that the scope of the present invention be dictated by the appended claims rather than by the description of the preferred method.

I claim:

1. A clean up composition for use in connection with the clean up of an oil based composition comprising:

about 5–60% by weight of a solubility of controlling component compatible with said oil based composition, wherein said solubility controlling component comprises a water reducible resin having pH dependent water solubility and an Acid Number greater than 25, said solubility controlling component being further present in sufficient quantity for said oil based composition to be substantially water insoluble at an acidic pH and water washable at an alkaline pH, and about 30–95% by weight of a diluent compatible with both said solubility controlling component and said oil based composition, said diluent further being present in sufficient quantity to provide said clean up composition with a viscosity less than about 300 centipoise.

2. The clean up composition of claim 1 wherein said diluent is present in sufficient quantity to provide the clean up composition with a viscosity less than about 100 centipoise.

3. The clean up composition of claim 2 wherein said solubility controlling component is selected from the group consisting of a water reducible alkyd, a water reducible polyester, a water reducible polyolefin, a water reducible modified oil, a water reducible epoxy ester and mixtures thereof.

4. The clean up composition of claim 3 wherein said solubility controlling component is present in an amount of about 10–30% by weight.

5. The clean up composition of claim 4 wherein said diluent is selected from the group consisting of a fatty acid, a vegetable oil, mineral oil and mixtures thereof.

6. The clean up composition of claim 1 including 0.5–10% by weight of a surfactant.

* * * * *